US010929961B2

(12) United States Patent
Kim et al.

(10) Patent No.: US 10,929,961 B2
(45) Date of Patent: Feb. 23, 2021

(54) ELECTRONIC DEVICE AND METHOD FOR CORRECTING IMAGES USING EXTERNAL ELECTRONIC DEVICE

(71) Applicant: Samsung Electronics Co., Ltd., Suwon-si (KR)

(72) Inventors: Sungoh Kim, Suwon-si (KR); Youngjo Kim, Suwon-si (KR); Hyungju Chun, Suwon-si (KR); Jongbum Choi, Suwon-si (KR); Hajoong Park, Suwon-si (KR); Haedong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 16/263,790

(22) Filed: Jan. 31, 2019

(65) Prior Publication Data

US 2019/0251670 A1 Aug. 15, 2019

(30) Foreign Application Priority Data

Feb. 9, 2018 (KR) .......................... 10-2018-0016553

(51) Int. Cl.
*G06T 5/00* (2006.01)
*H04N 5/232* (2006.01)
*G06T 7/11* (2017.01)

(52) U.S. Cl.
CPC ................ *G06T 5/003* (2013.01); *G06T 7/11* (2017.01); *H04N 5/23267* (2013.01)

(58) Field of Classification Search
CPC combination set(s) only.
See application file for complete search history.

(56) References Cited

U.S. PATENT DOCUMENTS

| 5,606,365 | A | 2/1997 | Maurinus et al. |
| 7,933,454 | B2* | 4/2011 | Bressan ................... G06T 5/00 382/224 |

(Continued)

FOREIGN PATENT DOCUMENTS

| EP | 1 453 002 A2 | 9/2004 |
| EP | 3 590 092 A1 | 1/2020 |

(Continued)

OTHER PUBLICATIONS

Ferzli R, Karam JL (2009) A no-reference objective image sharpness metric based on the notion of just noticeable blur (JNB). IEEE Trans Image Process 18(4): 717-728, Apr. 2009.

(Continued)

*Primary Examiner* — Tsung Yin Tsai
(74) *Attorney, Agent, or Firm* — Jefferson IP Law, LLP

(57) ABSTRACT

An electronic device for image correction and a method therefore are provided. The electronic device includes a camera, a memory, a communication circuit, and at least one processor. The at least one processor is configured to obtain a raw image of an external object using the camera, determine whether correction of the raw image is necessary, when the correction of the raw image is determined not to be necessary, store an image corresponding to the raw image in the memory, and when the correction of the raw image is determined to be necessary, transmit the raw image to an external electronic device via the communication circuit so as to enable the external electronic device to generate a corrected image of the raw image, and store the corrected image in the memory.

18 Claims, 11 Drawing Sheets

(56) References Cited

U.S. PATENT DOCUMENTS

| | | | |
|---|---|---|---|
| 8,081,227 B1* | 12/2011 | Kim | H04N 5/23218 348/211.3 |
| 9,667,694 B1 | 5/2017 | Wagner et al. | |
| 2006/0120618 A1 | 6/2006 | Mizoguchi | |
| 2008/0317358 A1 | 12/2008 | Bressan et al. | |
| 2008/0317379 A1* | 12/2008 | Steinberg | H04N 5/347 382/275 |
| 2013/0166711 A1 | 6/2013 | Wang et al. | |
| 2014/0341425 A1 | 11/2014 | Babacan et al. | |
| 2015/0161755 A1 | 6/2015 | Jang et al. | |
| 2015/0221066 A1 | 8/2015 | Kobayashi | |
| 2016/0034704 A1 | 2/2016 | Shim et al. | |
| 2018/0336666 A1* | 11/2018 | Kim | G06T 7/70 |

FOREIGN PATENT DOCUMENTS

| | | |
|---|---|---|
| JP | 2006-190259 A | 7/2006 |
| JP | 6088541 B2 | 3/2017 |
| JP | 2017-533484 A | 11/2017 |
| KR | 10-1517405 B1 | 5/2015 |
| KR | 10-2016-0016553 A | 2/2016 |
| KR | 10-2018-0127782 A | 11/2018 |

OTHER PUBLICATIONS

Narvekar ND, Karam LJ (2011) A no-reference image blur metric based on the cumulative probability of blur detection (CPBD). IEEE Trans Image Process 20(9): 2678-2683, Sep. 2011.

Mittal A, Moorthy AK, Bovik AC (2012) No-reference image quality assessment in the spatial domain. IEEE Trans Image Process 21(12): 4695-4708, Dec. 2012.

International Search Report dated May 10, 2019, issued in an International application No. PCT/KR2019/001356.

Extended European Search Report dated Nov. 26, 2020, issued in European Application No. 19751415.1.

* cited by examiner

ELECTRONIC DEVICE AND METHOD FOR CORRECTING IMAGES USING EXTERNAL ELECTRONIC DEVICE

CROSS-REFERENCE TO RELATED APPLICATION(S)

This application is based on and claims priority under 35 U.S.C. § 119 of a Korean patent application number 10-2018-0016553, filed on Feb. 9, 2018, in the Korean Intellectual Property Office, the disclosure of which is incorporated by reference herein in its entirety.

BACKGROUND

1. Field

The disclosure relates to an image correction method using an external electronic device and an electronic device supporting the method.

2. Description of Related Art

Various electronic devices, such as a smartphone, a tablet personal computer, a portable multimedia player (PMP), a personal digital assistant (PDA), a laptop personal computer, and a wearable device like a wrist watch or a head-mounted display (HMD), include a camera and can take images using the camera.

Meanwhile, a user can take an image using the camera of an electronic device and upload the captured image to an external electronic device such as a social networking service (SNS).

However, when the user uploads an image photographed using the camera of the electronic device to an external electronic device, the data quota must be consumed owing to utilization of communication resources each time the user uploads an image.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an image correction method using an external electronic device and an electronic device supporting the method that can prevent an upload of unnecessary images when images are shared through a cloud service.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a memory, a communication circuit, and at least one processor. The at least one processor is configured to obtain a raw image of an external object using the camera, determine whether a correction of the raw image is necessary, when the correction of the raw image is determined not to be necessary, store an image corresponding to the raw image in the memory, and when the correction of the raw image is determined to be necessary, transmit the raw image to an external electronic device via the communication circuit so as to enable the external electronic device to generate a corrected image of the raw image, and store the corrected image in the memory.

In accordance with another aspect of the disclosure, a method for an electronic device is provided. The method includes obtaining a raw image of an external object using a camera, determining whether correction of the raw image is necessary, when the correction of the raw image is determined not to be necessary, storing an image corresponding to the raw image in a memory, and when the correction of the raw image is determined to be necessary, transmitting the raw image to an external electronic device via a communication circuit so as to enable the external electronic device to generate a corrected image of the raw image, and storing the corrected image in the memory.

In a feature of the disclosure, the image correction method using an external electronic device and the electronic device supporting the method implements sharing of images via a cloud service. Hence, the user can reduce the data usage burden and efficiently manage the obtained images.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
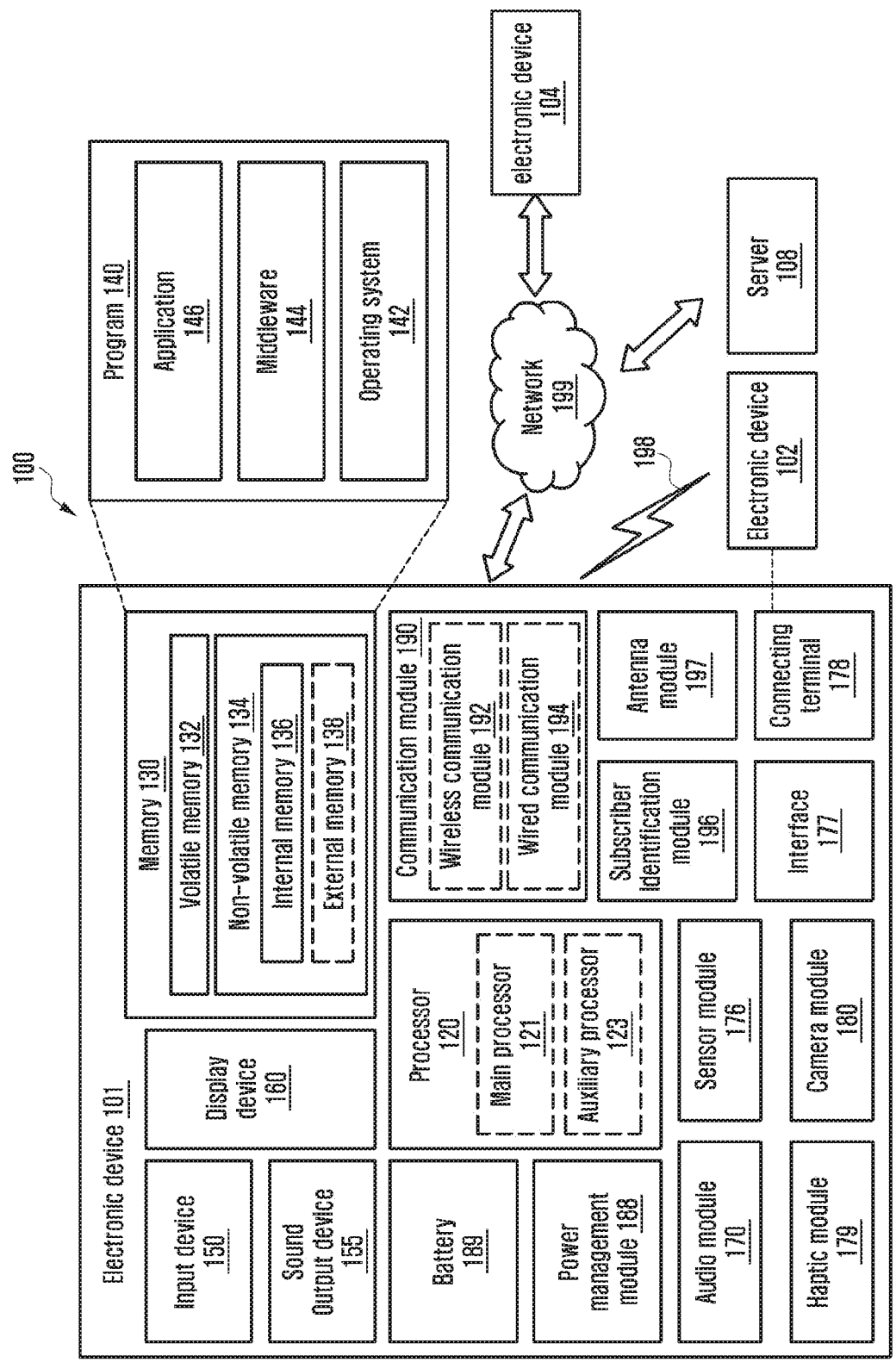
FIG. 1 is a diagram of electronic devices in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a communication circuit), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
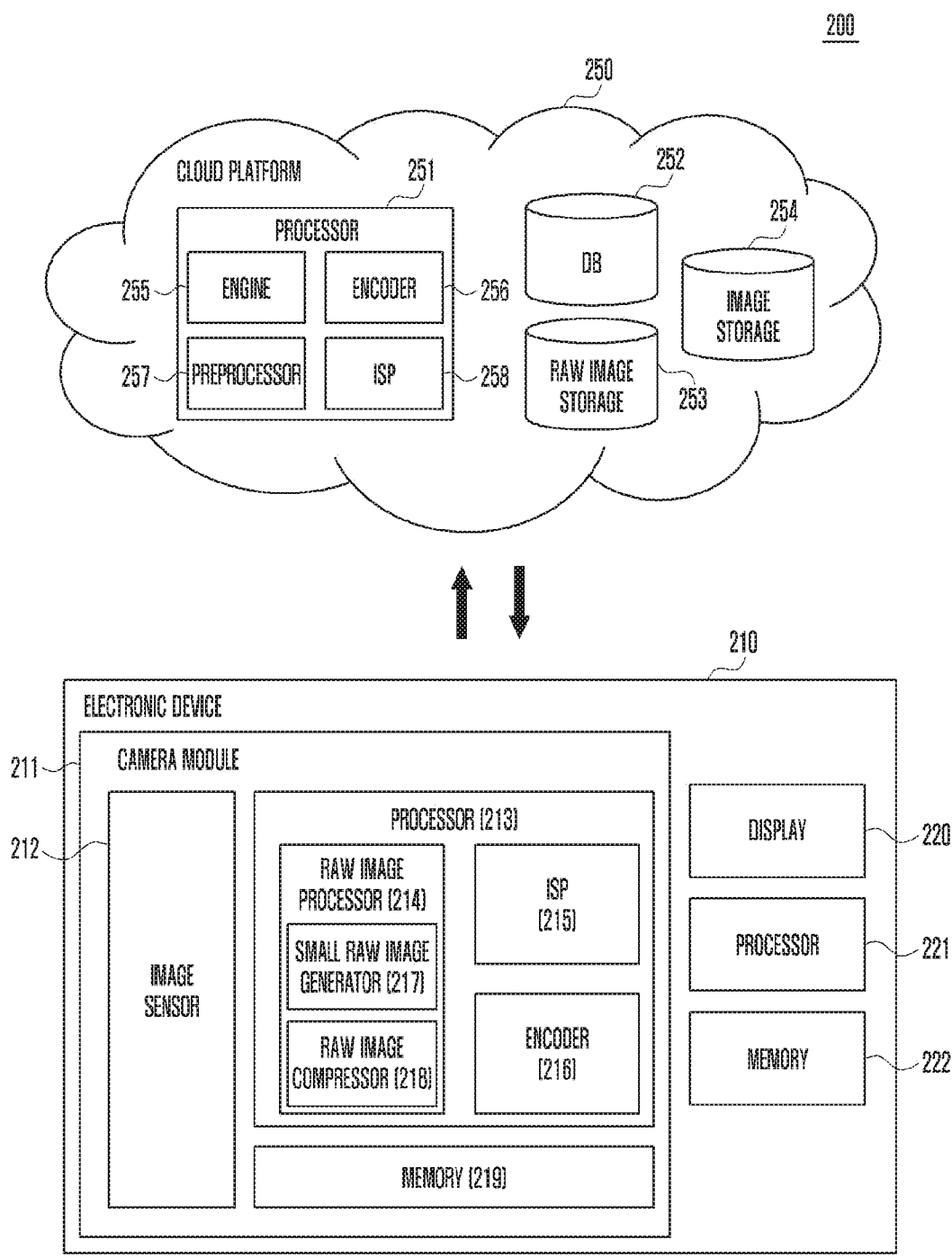
FIG. 2 is a diagram of an electronic device and a cloud platform according to an embodiment of the disclosure.

FIG. 2 is a diagram 200 of an electronic device 210 and a cloud platform 250 according to an embodiment of the disclosure.

Referring to FIG. 2, the electronic device 210 may include a camera module 211, a display 220, a processor 221, and memories 219 and 222. The electronic device 210 of FIG. 2 is identical to the electronic device 101 of FIG. 1. The camera module 211 of FIG. 2 is the same as the camera module 180 of FIG. 1. The display 220 of FIG. 2 is the same as the display 160 of FIG. 1. The processors 213 and 221 of FIG. 2 are identical to the processor 120 of FIG. 1. The memories 219 and 222 of FIG. 2 are identical to the memory 130 of FIG. 1.

The camera module 211 may include an image sensor 212, a processor 213, and a memory 219. The processor 213 may include a raw image processor 214, an image signal processor (ISP) 215, and an encoder 216.

The image sensor 212 may obtain a variety of raw images of a target object. The image sensor 212 may obtain various types of raw images according to color filter array (CFA) patterns. Using a dual pixel (DP or 2PD) structure of the image sensor 212, a raw image can be obtained that includes different phase difference (or parallax) information in one pixel. A plurality of image sensors having the same or different characteristics (for example, dual sensors (e.g., RGB+RGB, RGB+Mono, Wide+Tele), array sensors (e.g. two or more sensors attached)) can be used to obtain one or more raw images for one scene. The obtained raw image may be stored in the memory 222 as it is or through additional processing.

The image sensor 212 can obtain an image corresponding to a target object by converting the light transmitted from the target object through a lens assembly (not shown) into an electrical signal. In an embodiment, the image sensor 212 may include one image sensor, a plurality of image sensors having the same property, or a plurality of image sensors having different properties selected from among image sensors having different properties such as an RGB sensor, a BW (black and white) sensor, an IR sensor, and a UV sensor. Each image sensor included in the image sensor 212 may be implemented by, for example, charge coupled devices (CCDs) or complementary metal oxide semiconductor (CMOS) devices.

The camera module 211 may further include a lens assembly (not shown), a flash (not shown), and an image stabilizer (not shown).

The lens assembly can collect light emitted from the target object to be photographed. The lens assembly may include one or more lenses.

In an embodiment, the camera module 211 may include a plurality of lens assemblies (not shown). In this case, the camera module 211 may be, for example, a dual camera, a 360-degree camera, or a spherical camera. Those lens assemblies may have the same lens properties (e.g., angle of view, focal length, autofocus, f number, or optical zoom), or at least one lens assembly may have at least one different lens property from the other lens assemblies. The lens assembly may include, for example, a wide-angle lens or a telephoto lens. The flash (not shown) may serve as a light source used to enhance the light emitted from the target object. The flash may include one or more light emitting diodes (e.g., red-green-blue (RGB) LED, white LED, infrared LED, or ultraviolet LED), or a xenon lamp.

In response to movement of the image sensor 212 (e.g., a camera module) or the electronic device 210 including it, the image stabilizer (not shown) can move at least one lens or the image sensor 212 included in the lens assembly in a specific direction or control the same (e.g., adjusting the read-out timing) to at least partially compensate for the negative impact of the movement on the image being captured (e.g., image blurring). In an embodiment, the image stabilizer may be, for example, an optical image stabilizer, and may sense the movement using a gyro sensor (not shown) or an acceleration sensor (not shown) disposed inside or outside the image sensor 212.

The raw image can have various formats (e.g. Bayer format). The raw image can be represented by one color among R (red), G (green), and B (blue) colors of the pixel of the image sensor 212, and may have a bit depth of 8 to 16 bits. Various color filter array (CFA) patterns can be applied to a raw image. A raw image may have a layer structure including information on a plurality of colors (e.g., multiple colors among R, G, and B) for one pixel. A raw image may include not only color information (e.g., RGB) but also phase difference information depending on various configurations of the image sensor 212. Information related to the shooting (e.g., date and time, location, illumination) can be generated as metadata and stored in association with the raw image.

The processors 213 and 221 of the electronic device may perform various operations associated with image processing. Various image processing components (e.g., raw image processor 214, image signal processor (ISP) 215, and encoder 216) may be included in one processor 213 or 221 or may be distributed in the processors 213 and 221. The processor 213 may be disposed inside the camera module 211, outside the camera module 211 (e.g., electronic device 210, or one or more servers constituting a part of the cloud platform 250), or both inside and outside the camera module 211. Various tasks may be processed by one processor or may be processed by a plurality of processors in a distributed manner.

The raw image processor 214 may perform various operations on the raw image obtained by the image sensor 212. The raw image processor 214 may perform lens distortion compensation on the raw image or may remove some noise from the raw image. As raw images can be quite large in size, the raw image processor 214 may reduce the data size of a raw image through various operations (e.g., down scaling, down sampling, or compression) before storing, processing, or transmitting the raw image.

The small raw image generator 217 may generate a small raw image by downscaling (e.g., reducing the size or lowering the resolution) or downsampling (e.g., taking only one or some of a series of samples) a raw image.

The raw image compressor 218 can compress a raw image or a small raw image using various image compression algorithms.

The ISP 215 performs various image processing operations on a raw image by use of recipe information including various information on the raw image analyzed by the engine 255. The electronic device 210 may receive recipe information from the cloud platform 250 and perform raw image processing based on the recipe information through the ISP 215. For example, the electronic device 210 can perform composite image processing by using image processing provided by an embedded ISP and image processing based on the recipe information. When image processing is performed in the cloud platform 250, raw image processing based on the recipe information may be performed through the ISP 258 included in the cloud platform 250. The ISP 258 of the cloud platform 250 may receive additional information (e.g., feature vector) corresponding to the recipe information from the database 252 and use the additional information for image processing. The processed image may be transmitted to the electronic device 210 or stored in the image storage 254 of the cloud platform 250. Image processing may include functions such as white balancing, color adjustment, noise reduction, sharpening, and detail enhancement. These functions can be performed on each region of the image based on the recipe information.

The ISP 215 may apply image processing operations (e.g., depth map generation, three-dimensional modeling, panorama generation, feature point extraction, image synthesis, and image compensation such as noise reduction, resolution adjustment, brightness adjustment, blurring, sharpening, or softening) to an image obtained through the image sensor 212 or stored in the memories 219 and 222. Additionally or alternatively, the ISP 215 may control at least one of the components (e.g., image sensor 212) included in the camera module 211 (e.g., exposure time control, or read-out timing control). For further processing, the image processed by the ISP 215 may be stored again in the memories 219 and/or 222 or may be transmitted to an external component (e.g., memory 130, display 160, electronic device 102, electronic device 104, or server 108) of the camera module 180. In an embodiment, the ISP 215 may be implemented as a part of the processors 213 and 221 or may be implemented as a separate processor operating independently of the processors 213 and 221. If implemented as a separate processor, the images processed by the ISP 215 may be displayed on the display 220 as they are or after additional image processing by the processors 213 and 221.

The encoder 216 may encode a raw image to produce an image file (e.g., JPEG, MPEG, or 360-degree video).

The electronic device 210 may include a memory 222 inside the camera module 211 and/or a memory 222 outside the camera module 211. The memories 219 and 222 may store a raw image, a small raw image, an image file, and an image-processed raw image. The memories 219 and 222 may at least temporarily store at least a portion of the image obtained through the image sensor 212 for subsequent image processing. For example, if image acquisition is delayed according to the shutter or a plurality of images are obtained at high speed, the obtained original image (e.g., high resolution image) may be stored in the memories 219 and 222, and a corresponding copied image (e.g., low resolution image) may be previewed on the display 220. Thereafter, if a specified condition is satisfied (e.g., user input or system command), at least a portion of the original image that has been stored in the memories 219 and 222 may be processed by, for example, the ISP 215. In an embodiment, the memory 219 may be at least a portion of the memory 222, or may be a separate memory operating independently of the memory 222.

The electronic device 210 may include a display 220 (i.e., the display 160 of FIG. 1).

The cloud platform 250 as an external device may include a processor 251, a database 252, a raw image storage 253, and an image storage 254. The processor 251 may include an engine 255 (e.g., recognition engine), an encoder 256, a preprocessor 257, and an ISP 258.

The processor 251 of the cloud platform 250 may perform various operations related to image processing. Various image processing components (e.g., engine 255, encoder 256, preprocessor 257, and ISP 258) may be included in one processor or may be distributed among multiple processors.

The engine 255 analyzes an image (e.g., raw image, small raw image, and image file) to generate various meaningful information (e.g., object recognition, velocity vector, face recognition, segmentation, and scene parsing). To this end, the engine 255 may include various algorithms. As a result of analysis, the engine 255 may generate, store, or transmit recipe information (including, for example, segments, layers, vectors, or scene categories), which can be used by the ISP for various image processing operations, in association with a specific image.

The encoder 256 may encode a raw image to produce an image file (e.g., JPEG, MPEG, or 360-degree video).

The preprocessor 257 may perform necessary operations on a raw image received from the electronic device 210 before forwarding the raw image to the engine 255 or the ISP 258. The preprocessor 257 can perform operations such as decompression of a compressed raw image, simple image quality enhancement, demosaicing, and image format conversion.

The ISP 258 performs various image processing operations on a raw image based on the recipe information including various information on the raw image analyzed by the engine 255. The electronic device 210 may receive recipe information from the cloud platform 250 and perform raw image processing based on the recipe information by use of the ISP 215. For example, the electronic device 210 can perform image processing using both the embedded ISP and the recipe information in a composite manner. When image processing is performed in the cloud platform 250, raw image processing may be performed based on the recipe information through the ISP 258 included in the cloud platform 250. The ISP 258 of the cloud platform 250 may receive additional information (e.g., feature vector) corresponding to the recipe information from the database 252 and use it for image processing. The processed image may be transmitted to the electronic device 210 or may be stored in the image storage 254 of the cloud platform 250. Image processing may include functions such as white balancing, color adjustment, noise reduction, sharpening, and detail enhancement. These functions can be performed for each region of the image based on the recipe information.

The database 252 may store features corresponding to the image categories. The raw image storage 253 can store raw images. The image storage 254 may store image files.

Figure 3:
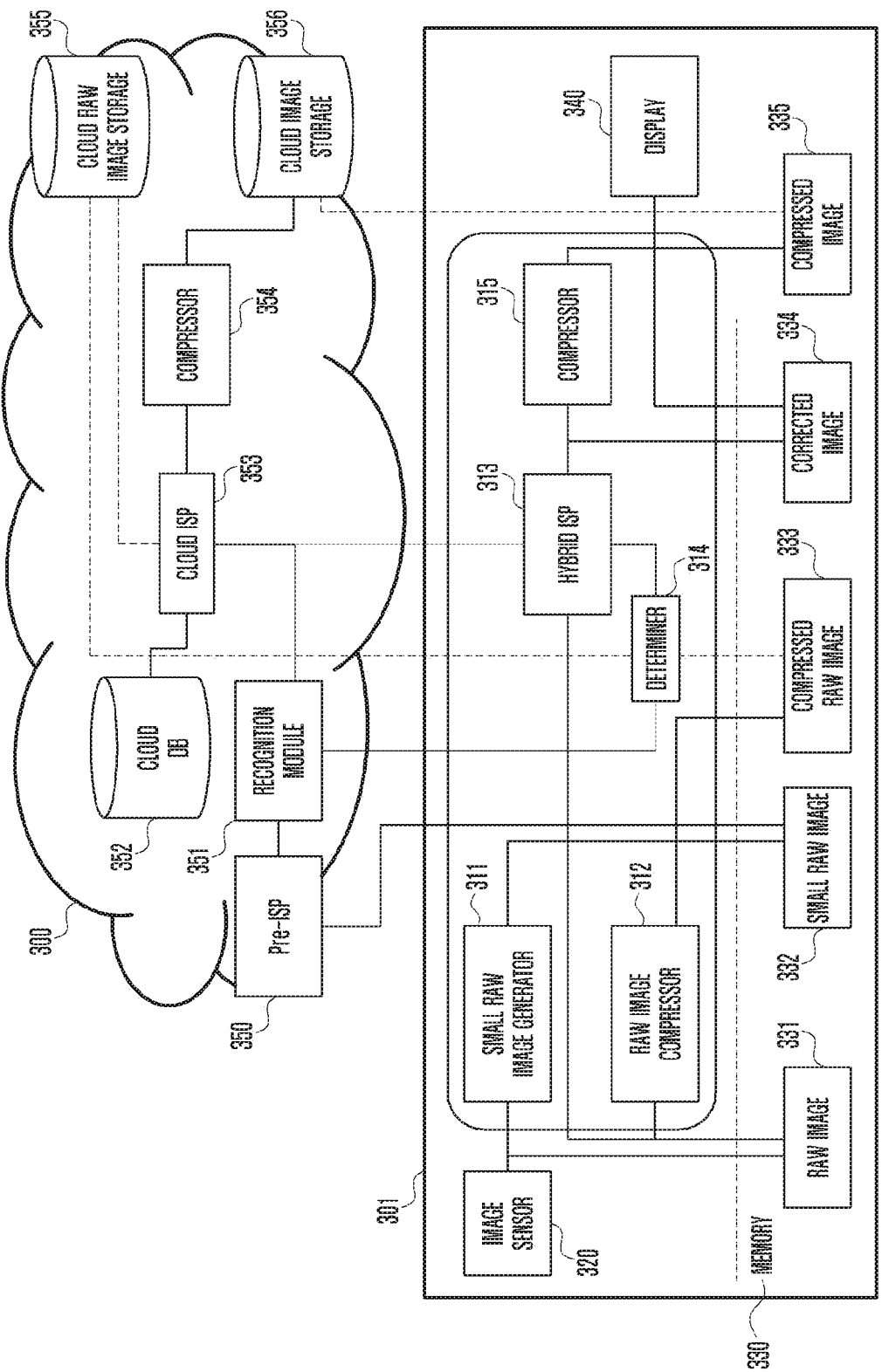
FIG. 3 is a conceptual diagram illustrating operations of the electronic device and the external electronic device according to an embodiment of the disclosure.

FIG. 3 is a conceptual diagram depicting operations of the electronic device 301 (e.g., electronic device 101, or electronic device 210) and an external electronic device 300 (e.g., server 108, or cloud platform 250) according to an embodiment of the disclosure.

The electronic device 301 may include a processor 310 (e.g., processor 120 of FIG. 1, or processors 213 or 221 of FIG. 2), an image sensor 320, and a memory 330.

The processor 310 may include a small raw image generator 311, a raw image compressor 312, a hybrid ISP 313, and a determiner 314.

The external electronic device 300 may include a pre-ISP 350 (e.g., preprocessor 257 in FIG. 2), a recognition module 351 (e.g. engine 255 in FIG. 2), a cloud ISP 353 (e.g., ISP 258 in FIG. 2), a cloud database 352 (e.g., database 252 in FIG. 2), a cloud raw image storage 355 (e.g., raw image storage 253), and a cloud image storage 356 (e.g., the image storage 254 of FIG. 2).

The pre-ISP 350 may perform necessary operations on a raw image received from the electronic device 301 before forwarding the raw image to the recognition module 351 or the cloud ISP 353. The pre-ISP 350 can perform operations such as decompression of a compressed raw image, simple image quality enhancement, demosaicing, and image format conversion.

The recognition module 351 may be a logical module or may be implemented by a processor of the external electronic device 300. The cloud ISP 353 may also be implemented by the processor of the external electronic device 300. For example, the processor of the external electronic device 300 may perform both recognition and image processing. Although not shown, the electronic device 301 may include a communication module (e.g., communication interface or communication module 190) to exchange data with the external electronic device 300. The external electronic device 300 may include a communication module to exchange data with the electronic device 301.

The image sensor 320 (e.g., image sensor 212) may capture an image of an external object and generate a corresponding raw image 331. The image sensor 321 may transfer the raw image 331 to the small raw image generator 311 and the memory 330. The raw image 331 stored in the memory 330 can be transferred to the raw image compressor 312 and the hybrid ISP 313.

The small raw image generator 311 may generate a small raw image 332 and transmit it to the external electronic device 300 through the communication module.

In another embodiment, the image sensor 321 may generate a small raw image 332 and transmit it to the external electronic device 300 through the communication module.

The raw image compressor 312 may compress a raw image 331 stored in the memory 330 to generate a compressed raw image and store the compressed raw image in the memory 330.

In another embodiment, the image sensor 320 may transmit a compressed raw image 331 to the hybrid ISP 313 or the external electronic device 300.

In another embodiment, the image sensor 320 may store a compressed raw image 331 in the memory 330 for partial raw image processing.

The pre-ISP 350 of the external electronic device 300 can obtain a small raw image 332 through the communication module. The pre-ISP 350 may perform necessary operations on a small raw image 332 received from the electronic device 301 before transferring the small raw image 332 to the recognition module 351 or the cloud ISP 353. The pre-ISP 350 can perform operations such as decompression of a compressed raw image, simple image quality enhancement, demosaicing, and image format conversion.

The recognition module 351 of the external electronic device 300 may obtain a small raw image 332 processed by the pre-ISP 350.

In another embodiment, the recognition module 351 of the external electronic device 300 may obtain a small raw image 332 via the communication module.

The recognition module 351 may segment a small raw image 332 into at least one image region. The recognition module 351 can recognize each of the image regions obtained as a result of segmentation. Information associated with the multiple image regions generated by the recognition module 351, for example, correction region information including at least one of coordinate information or recognition results of the image regions, may be generated. The correction region information may be transmitted to the determiner 314 of the electronic device 301 via the communication module.

The hybrid ISP 313 may use the correction region information to correct a raw image 331, generating a corrected image 334. The corrected image 334 may have, for example, a YUV format. The corrected image 334 may be stored in the memory 330. Alternatively, the corrected image 334 may be compressed by the compressor 315 in accordance with, for example, the JPEG scheme, and the corresponding compressed image 335 may be stored in the memory 330.

In addition to the correction region information received from the recognition module 351, the hybrid ISP 313 can perform image processing of a raw image 331 stored by the image sensor 320 in the memory 330, and generate information according to the result of processing (e.g., correction information).

The determiner 314 of the electronic device 301 may receive information (e.g., correction region information) about a small raw image 332 from the recognition module 351 of the external electronic device 300, and determine whether to transfer at least one of the raw image 331, the corrected image 334, or the compressed image 335.

In various embodiments, the raw image 331 provided from the image sensor 320 may be transmitted to the external electronic device 300 separately from the small raw image 332. As the raw image 331 is larger in size than the small raw image 332, the small raw image 332 is first transmitted to the external electronic device 300 and then the raw image 331 or the compressed raw image 332 may be transmitted to the external electronic device 300. For example, while the hybrid ISP 313 is correcting the raw image 331, the raw image 331 or compressed raw image 333 may be transmitted to the external electronic device 300. In the case of a raw image 331, the raw image 331 generated by the image sensor 320 may be uploaded to the external electronic device 300 as it is, or a preprocessed image to which lens distortion correction or noise removal has been applied may be uploaded.

The above-described preprocessing may be performed by the pre-ISP 350 of the external electronic device 300. The external electronic device 300 may perform preprocessing for demosaicing, image format conversion, or image recognition enhancement.

The cloud ISP 353 of the external electronic device 300 may correct a received raw image 331. The external electronic device 300 may correct the raw image 331 using the existing correction region information or using the extended correction region information. As the raw image 331 may be higher in quality than the small raw image 332, the cloud ISP 353 of the external electronic device 300 can obtain more detailed correction region information from the high resolution image. The cloud ISP 353 may generate the extended correction region information by using the existing correction region information and the raw image 331 together. The cloud ISP 353 can obtain a high quality image by correcting the raw image 331 using the extended correction region information. The high quality image may be stored in the cloud image storage 356 of the external electronic device 300, and may be downloaded to the electronic device 301.

The external electronic device 300 may be implemented, for example, as a cloud server, so that the cloud ISP 353 of the external electronic device may be referred to as an ISP. The cloud ISP 353 of the external electronic device may perform at least one of the correction operations including original color mapping, detail regeneration, text reconstruction, image inpainting, scene based white balancing, color adjustment, segmentation based noise reduction (NR), sharpening, and segmentation based detail enhancement.

Figure 4:
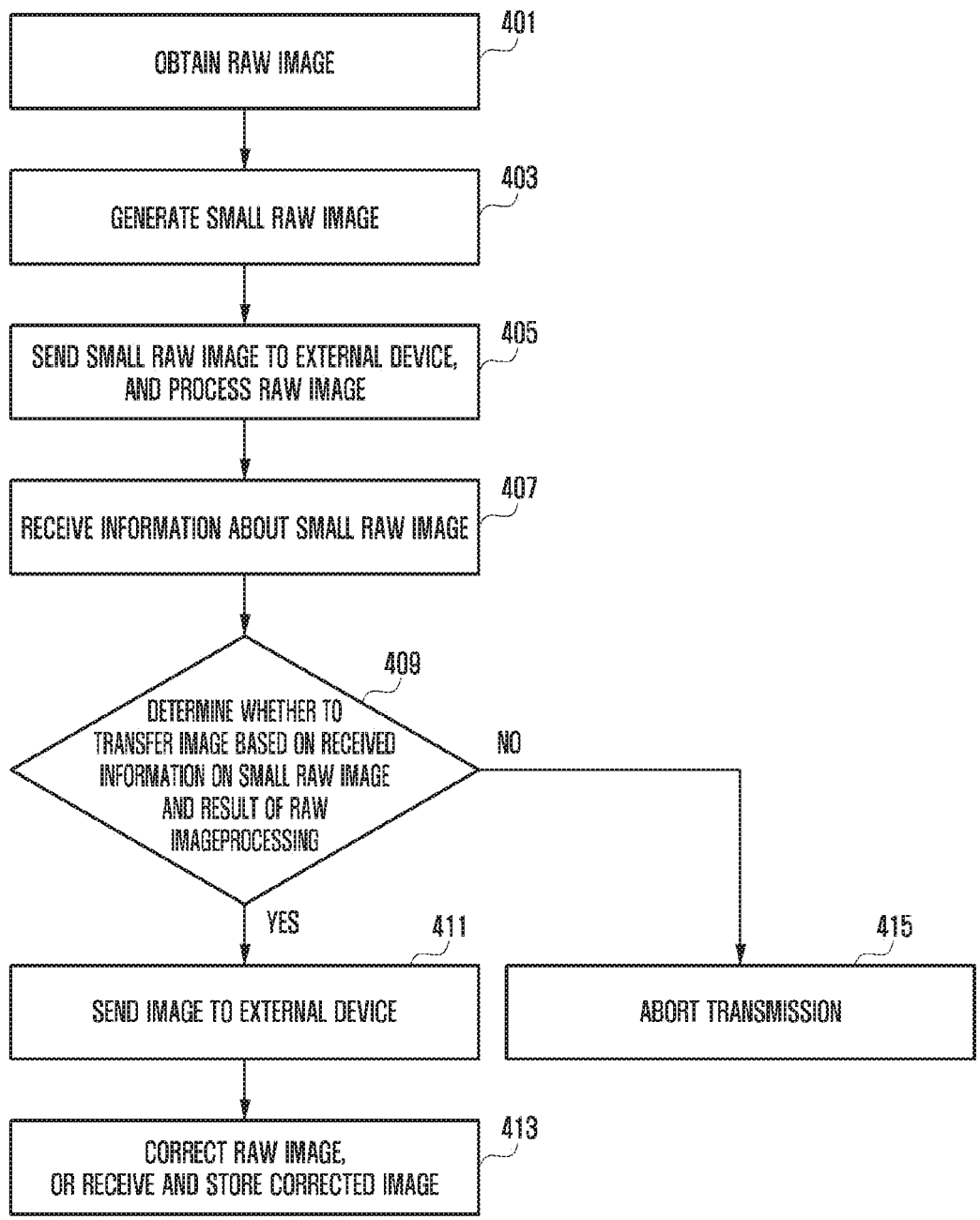
FIG. 4 is a flowchart of a selective image transmission method according to an embodiment of the disclosure.

FIG. 4 is a flowchart of a selective image transmission method according to an embodiment of the disclosure.

At operation 401, the electronic device 301 may obtain a raw image 331 using the image sensor 320 under the control of the processor 310.

At operation 403, the electronic device 301 may generate a small raw image 332 under the control of the processor 310.

In various embodiments, the electronic device 301 may generate a small raw image 332 via the small raw image generator 311 under the control of the processor 310 at operation 403.

At operation 405, the electronic device 301 may transmit the small raw image 332 to the external electronic device 300 via the communication module, and may perform image processing operations on the raw image 331, under the control of the processor 310.

In various embodiments, under the control of the processor 310 at operation 405, the electronic device 301 may transmit the small raw image 332 to the external electronic device 300 and may perform image processing of the raw image 331 via the hybrid ISP 313.

At operation 407, the electronic device 301 may receive information on the small raw image 332 (e.g., correction region information for the small raw image 332) from the external electronic device 300 via the communication module under the control of the processor 310. The information about the small raw image 332 (e.g., correction region information for the small raw image 332) can be obtained through the recognition module 351 of the external electronic device 300.

At operation 409, based on the information on the small raw image 332 received from the external electronic device 300 and the information on the result of image processing of the raw image 331 obtained through the hybrid ISP 313, the electronic device 301 may determine whether to transfer at least one of the raw image 331, the compressed raw image 333, the corrected image 334, or the compressed image 335 to the external electronic device under the control of the processor 310.

In various embodiments, under the control of the processor 310 at operation 409, based on the information on the small raw image 332 received from the external electronic device 300 and the information on the result of image processing of the raw image 331 obtained through the hybrid ISP 313, the electronic device 301 may use the determiner 314 to determine whether to transfer at least one of the raw image 331, the compressed raw image 333, the corrected image 334, or the compressed image 335 to the external electronic device.

In various embodiments, under the control of the processor 310 at operation 409, based on the information on the small raw image 332 received from the external electronic device 300 and the information on the result of image processing of the raw image 331 obtained through the hybrid ISP 313, the electronic device 301 may determine image transfer to the external electronic device 300 according to the degree to which the raw image 331 is blurred, the degree of shake of the electronic device 301 at the time of shooting, the extent to which the recognized information is meaningful, and the expected level of image enhancement due to correction.

The recognition module 351 of the external electronic device 300 may include information about classification as shown in Table 1 for analyzing the obtained small raw image 332 and classifying the information about the recognized object in the image.

TABLE 1

| Level 1 | Level 2 | Level 3 |
|---|---|---|
| Human | Hair | <7 |
| | | ≤7~<19 |
| | | ≤19~<39 |
| | | ≤39~<81 |
| | | ≤81~<151 |
| | | ≤151~ |
| | Fabric of clothing | 1. random pattern or very small pattern (ex. like suede, fine hairs) |
| | | 2. ≤2 × 2~<7 × 7 pattern |
| | | 3. ≤7 × 7~<11 × 11 pattern |
| | | 4. ≤11 × 11~<17 × 17 pattern |
| | | 5. large pattern or Plat Region |
| | Eye | |
| | Skin | |
| | Nose | |
| | Mouth | |
| | Brow | |
| Fabrics (all kinds of fibers) | | |
| Plant | small leaves | |
| | broad leaves | |
| | needle leaves | |
| | branch/bark | |
| Animal | Hair | |
| | Eye | |
| | Nose | |
| | Skin with repeated patterns | |
| | Skin with random patterns | |
| Text | Korean character | |
| | English alphabet | |
| | Chinese character | |
| | Japanese character | |
| | Roman character | |
| | Number | |
| | Mathematical symbol | |
| Fields | Asphalt | |
| | Pavements | |
| | Gravel | |
| | Grass | |
| | Sand | |
| | Wire entanglement | |
| | Building exterior | |

In Table 1, three levels of classification are used; and level 1 categories or criteria include humans, fabrics, plants, animals, text, and fields. For example, humans may be classified according to level 2 criteria (hair, fabric, eye, nose, mouth, and eyebrow), and the hairs may be classified according to level 3 criteria (the diameter of the pixel).

In various embodiments, under the control of the processor 310 at operation 409, based on the information on the small raw image 332 received from the external electronic device 300 and the information on the result of image processing of the raw image 331 obtained through the hybrid ISP 313, the electronic device 301 may determine image transfer to the external electronic device 300 according to the degree to which the raw image 331 is blurred, the degree of shake of the electronic device 301 at the time of shooting, the ISO value, the extent to which the recognized information is meaningful with respect to the corresponding category, and the expected level of image enhancement due to correction.

Based on the information on the small raw image 332 received from the external electronic device 300 and the information on the result of image processing of the raw image 331 obtained through the hybrid ISP 313, the determiner 314 may determine image transfer to the external electronic device 300 according to the degree to which the raw image 331 is blurred, the degree of shake of the electronic device 301 at the time of shooting, the ISO value, the extent to which the recognized information is meaningful with respect to the corresponding category, and the expected level of image enhancement due to correction. This transfer determination can be made according to the determination criteria illustrated in Table 2.

TABLE 2

| Items | Determination criteria |
|---|---|
| Outside recognition category | Images other than human, plant, animal, text, and field scene |
| Amount of blur is above given threshold | Local Contrast, Sharpness, etc. (Blur Metric: JNB[1], CPBD[2], BRISQUE [3]) |
| Images whose quality is not expected to improve through processing of cloud ISP 353 | Low ISO value/Shake free and sharply focused |

In various embodiments, under the control of the processor 310 at operation 409, based on the information on the small raw image 332 received from the external electronic device 300 and the information on the result of image processing of the raw image 331 obtained through the hybrid ISP 313, the electronic device may determine image transfer to the external electronic device 300. That is, the procedure proceeds to operation 415 if the degree to which the raw image 331 is blurred is above a threshold, if the degree of shake of the electronic device 301 at the time of shooting is low, if the ISO value is small, if the recognized information is not meaningful with respect to the corresponding category, or if the expected level of image enhancement due to correction is low.

At operation 415, the electronic device 301 may abort transmitting at least one of the raw image 331, the compressed raw image 333, the corrected image 334, or the compressed image 335 to the external electronic device 300 under the control of the processor 310.

In various embodiments, under the control of the processor 310 at operation 409, based on the information on the small raw image 332 received from the external electronic device 300 and the information on the result of image processing of the raw image 331 obtained through the hybrid ISP 313, the electronic device may determine image transfer to the external electronic device 300. That is, the procedure proceeds to operation 411 if the degree to which the raw image 331 is blurred is below the threshold, if the degree of shake of the electronic device 301 at the time of shooting is high, if the ISO value is large, if the recognized information is meaningful with respect to the corresponding category, or if the expected level of image enhancement due to correction is high.

At operation 411, under the control of the processor 310, the electronic device 301 may transmit at least one of the raw image 331, the compressed raw image 333, the corrected image 334, or the compressed image 335 to the external electronic device 300 via the communication module.

At operation 413, under the control of the processor 310, the electronic device 301 may store at least one of the raw image 331, the compressed raw image 333, the corrected image 334, or the compressed image 335, or it may receive a corrected image 334 or a compressed image 335 from the external electronic device 300 and store the same.

Figure 5:
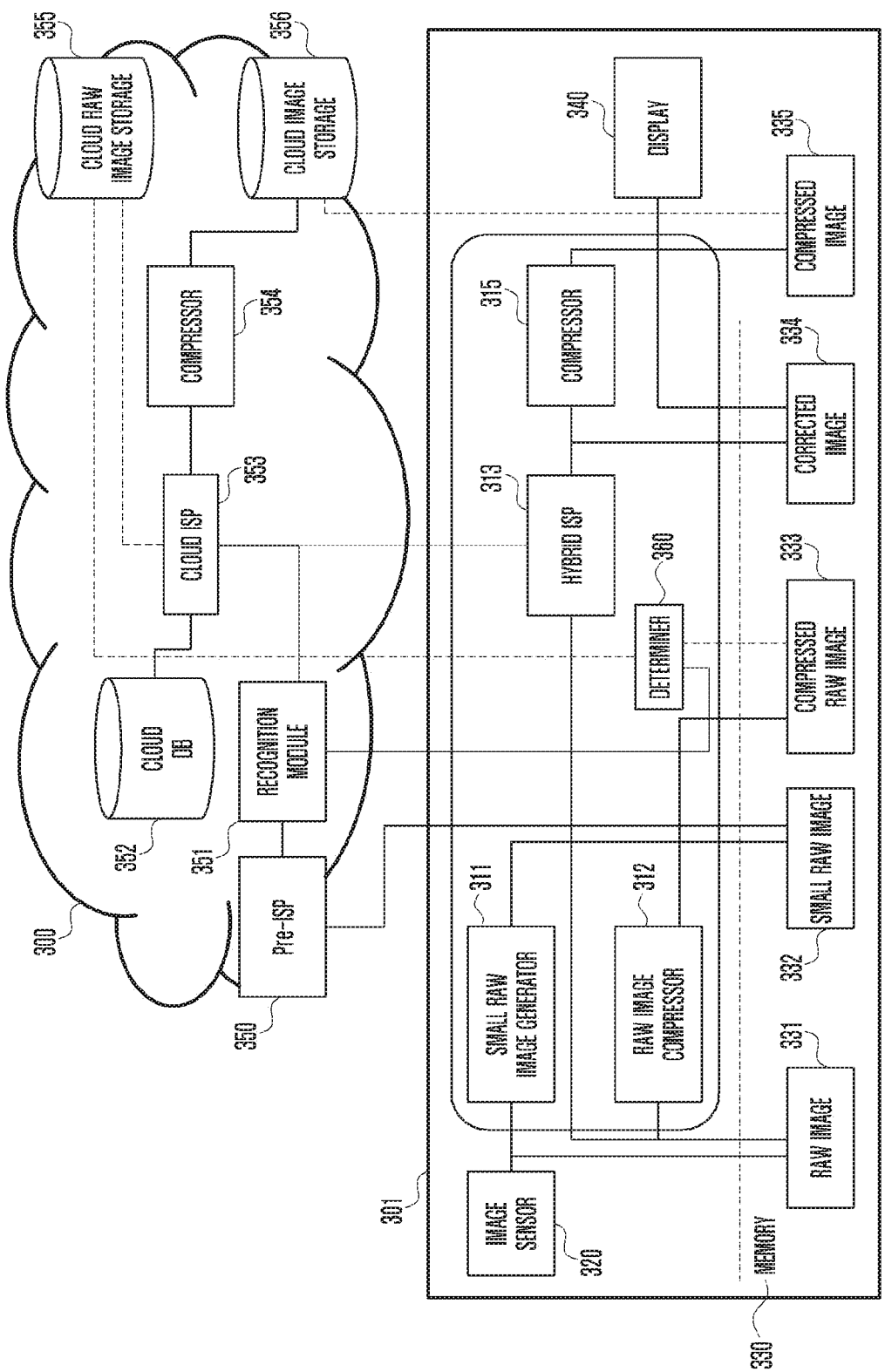
FIG. 5 is a conceptual diagram illustrating operations of the electronic device and the external electronic device according to an embodiment of the disclosure.

FIG. 5 is a conceptual diagram depicting operations of the electronic device 301 (e.g., electronic device 101, or electronic device 210) and an external electronic device 300 (e.g., server 108, or cloud platform 250) according to an embodiment of the disclosure.

The electronic device 301 and the external electronic device 300 of FIG. 5 may have the same configuration and functionality as the electronic device 301 and the external electronic device 300 of FIG. 3. However, the determiner 360 in FIG. 5 may be slightly different from the determiner 314 in FIG. 3.

The recognition module 351 may segment a small raw image 332 into at least one image region. The recognition module 351 can recognize each of the image regions obtained as a result of segmentation. Information associated with the multiple image regions generated by the recognition module 351, for example, correction region information including at least one of coordinate information or recognition results of the image regions, may be generated. The correction region information may be transmitted to the determiner 360 of the electronic device 301 via the communication module.

Based on the information (e.g., correction region information) about the small raw image 332 received from the recognition module 351 of the external electronic device 300, the determiner 360 of the electronic device 301 may determine whether to transmit at least one of the raw image 331, the corrected image 334, or the compressed image 335.

The determiner 360 of FIG. 5 may receive information (e.g., correction region information) about the small raw image 332 from the recognition module 351 of the external electronic device 300 and determine whether to transmit at least one of the raw image 331, the corrected image 334, or the compressed image 335, without information (e.g., correction information) about the result of image processing performed by the cloud ISP 353.

Figure 6:
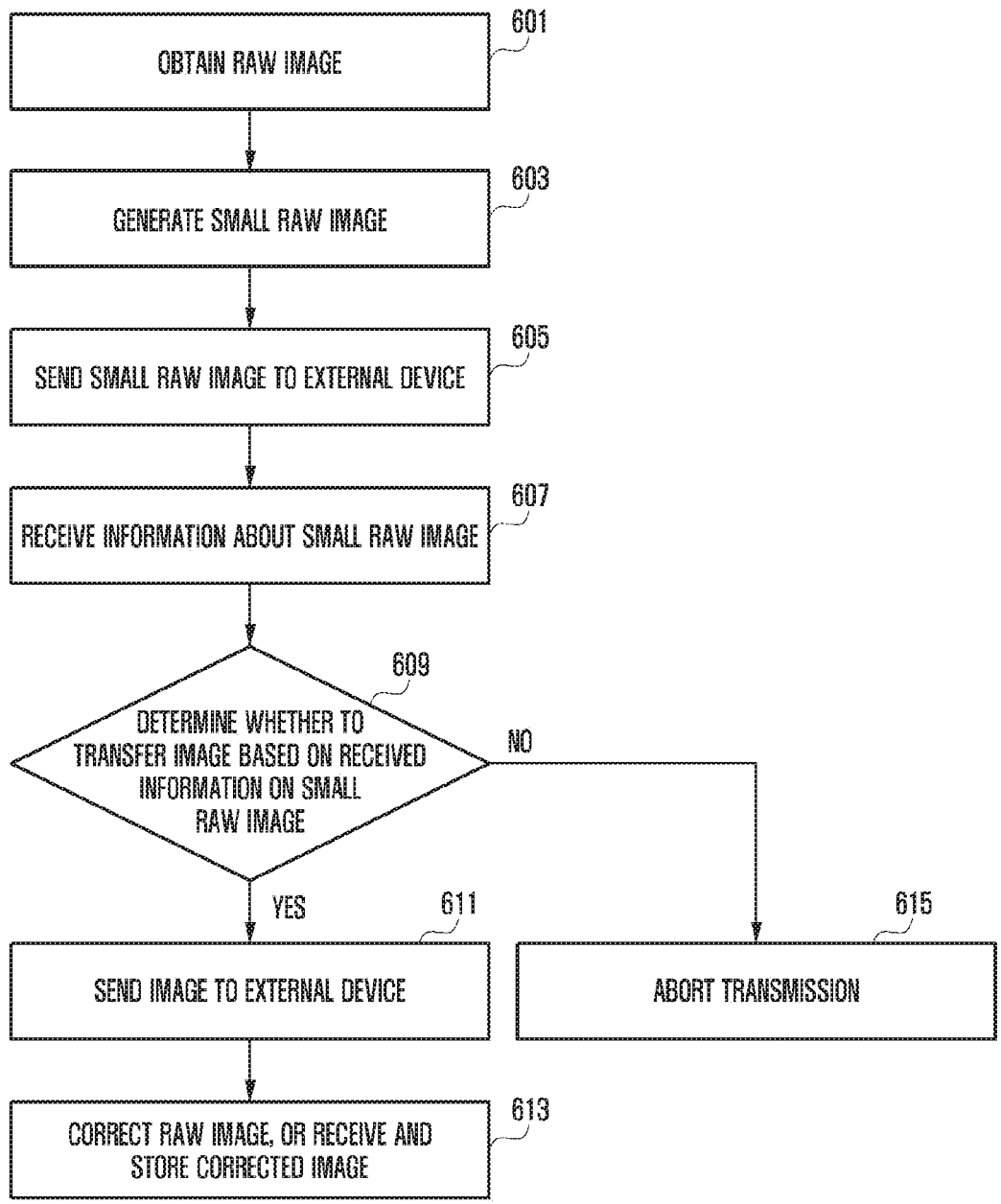
FIG. 6 is a flowchart of a selective image transmission method according to an embodiment of the disclosure.

FIG. 6 is a flowchart of a selective image transmission method according to an embodiment of the disclosure.

At operation 601, the electronic device 301 may obtain a raw image 331 using the image sensor 320 under the control of the processor 310.

At operation 603, the electronic device 301 may generate a small raw image 332 under the control of the processor 310.

In various embodiments, the electronic device 301 may generate a small raw image 332 via the small raw image generator 311 under the control of the processor 310 at operation 603.

At operation 605, the electronic device 301 may transmit the small raw image 332 to the external electronic device 300 via the communication module under the control of the processor 310.

At operation 607, the electronic device 301 may receive information on the small raw image 332 (e.g., correction region information for the small raw image 332) from the external electronic device 300 via the communication module under the control of the processor 310. The information about the small raw image 332 (e.g., correction region information for the small raw image 332) can be obtained through the recognition module 351 of the external electronic device 300.

At operation 609, based on the information on the small raw image 332 received from the external electronic device 300, the electronic device 301 may determine whether to transfer at least one of the raw image 331, the compressed raw image 333, the corrected image 334, or the compressed image 335 to the external electronic device under the control of the processor 310.

In various embodiments, under the control of the processor 310 at operation 609, based on the information on the result of image processing of the raw image 331 received from the external electronic device 300, the electronic device 301 may use the determiner 360 to determine whether to transfer at least one of the raw image 331, the compressed raw image 333, the corrected image 334, or the compressed image 335 to the external electronic device.

In various embodiments, under the control of the processor 310 at operation 609, based on the information on the small raw image 332 received from the external electronic device 300, the electronic device 301 may determine image transfer to the external electronic device 300 according to the degree to which the raw image 331 is blurred, the degree of shake of the electronic device 301 at the time of shooting, the extent to which the recognized information is meaningful, and the expected level of image enhancement due to correction.

In various embodiments, under the control of the processor 310 at operation 609, based on the information on the small raw image 332 received from the external electronic device 300, the electronic device 301 may check the degree to which the raw image 331 is blurred to determine image transfer. That is, the procedure may proceed from operation 609 to operation 611 if the degree to which the raw image 331 is blurred is below a threshold.

In various embodiments, under the control of the processor 310 at operation 609, based on the information on the small raw image 332 received from the external electronic device 300, the electronic device 301 may check the degree to which the raw image 331 is blurred to determine image transfer. That is, the procedure may proceed from operation 609 to operation 615 if the degree to which the raw image 331 is blurred is above the threshold.

In various embodiments, under the control of the processor 310 at operation 609, based on the information on the small raw image 332 received from the external electronic device 300, the electronic device 301 may check the degree of shake of the electronic device 301 to determine image transfer. That is, the procedure may proceed from operation 609 to operation 611 if the degree of shake of the electronic device 301 at the time of shooting is low.

In various embodiments, under the control of the processor 310 at operation 609, based on the information on the small raw image 332 received from the external electronic device 300, the electronic device 301 may check the degree of shake of the electronic device 301 to determine image transfer. That is, the procedure may proceed from operation 609 to operation 615 if the degree of shake of the electronic device 301 at the time of shooting is high.

The recognition module 351 of the external electronic device 300 may include information about classification as shown in Table 1 for analyzing the obtained small raw image 332 and classifying the information about the recognized object in the image.

In various embodiments, under the control of the processor 310 at operation 609, based on the information on the small raw image 332 received from the external electronic device 300, the electronic device 301 may determine image transfer to the external electronic device 300 according to the extent to which the recognized information is meaningful with respect to the corresponding category.

In various embodiments, under the control of the processor 310 at operation 609, based on the information on the small raw image 332 received from the external electronic device 300, the electronic device may check the meaningfulness of the recognized information to determine image transfer. That is, the procedure may proceed from operation 609 to operation 615 if the recognized information about the small raw image 332 is not meaningful with respect to the corresponding category of Table 1. The procedure may proceed from operation 609 to operation 611 if the recognized information about the small raw image 332 is meaningful with respect to the corresponding category of Table 1.

In various embodiments, under the control of the processor 310 at operation 609, based on the information on the small raw image 332 received from the external electronic device 300, the electronic device may check the expected level of image enhancement to determine image transfer. That is, the procedure may proceed from operation 609 to operation 611 if the expected level of image enhancement due to correction is high.

In various embodiments, under the control of the processor 310 at operation 609, based on the information on the small raw image 332 received from the external electronic device 300, the electronic device may check the expected level of image enhancement to determine image transfer. That is, the procedure may proceed from operation 609 to operation 615 if the expected level of image enhancement due to correction is low.

At operation 615, the electronic device 301 may abort transmitting at least one of the raw image 331, the compressed raw image 333, the corrected image 334, or the compressed image 335 to the external electronic device 300 under the control of the processor 310.

At operation 611, under the control of the processor 310, the electronic device 301 may transmit at least one of the raw image 331, the compressed raw image 333, the corrected image 334, or the compressed image 335 to the external electronic device 300 via the communication module.

At operation 613, under the control of the processor 310, the electronic device 301 may store at least one of the raw image 331, the compressed raw image 333, the corrected image 334, or the compressed image 335, or it may receive a corrected image 334 or a compressed image 335 from the external electronic device 300 and store the same.

Figure 7:
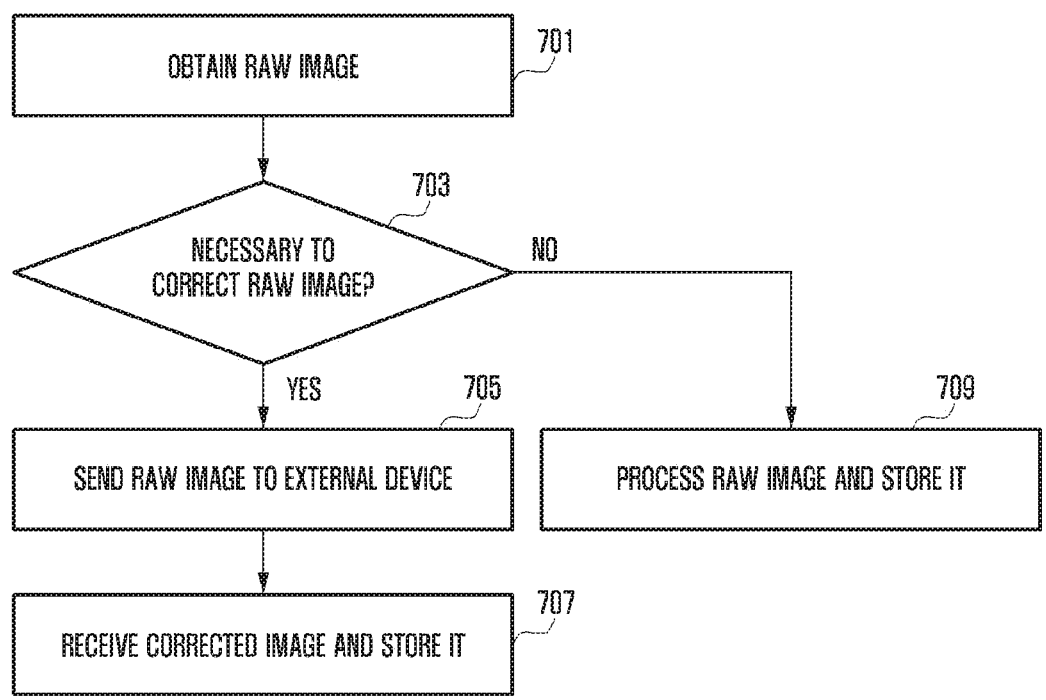
FIG. 7 is a flowchart of a selective image transmission method according to an embodiment of the disclosure.

FIG. 7 is a flowchart of a selective image transmission method according to an embodiment of the disclosure.

At operation 701, the electronic device 301 may obtain a raw image 331 of an external entity using the image sensor 320 under the control of the processor 310.

At operation 703, the electronic device 301 may determine whether there is a need for correcting the obtained raw image 331 under the control of the processor 310.

In various embodiments, to determine whether there is a need for correcting the obtained raw image 331 at operation 703, the electronic device 301 may transmit the raw image 331 to the external electronic device 300 via the communication module. Upon receiving the raw image 331 from the electronic device 301, the external electronic device 300 may identify the correction information. For example, the external electronic device 300 may use the recognition module 351 to generate correction information for the raw image 331 received from the electronic device 301. The external electronic device 300 may transmit the correction information for the raw image 331 to the electronic device 301. The electronic device 301 may receive the correction information for the raw image 331 from the external electronic device 300. The electronic device 301 may determine whether correction for the obtained raw image 331 is necessary at operation 703 based on the correction information for the raw image 331 received from the external electronic device 300.

In various embodiments, the correction information for the raw image 331 may be related with the degree to which the raw image 331 is blurred, the degree of shake of the electronic device 301 at the time of shooting, the extent to which the recognized information is meaningful, and the expected level of image enhancement due to correction.

In various embodiments, the electronic device 301 may determine that there is a need for correcting the raw image 331 under the control of the processor 310 at operation 703 if the degree to which the raw image 331 is blurred is above a threshold.

In various embodiments, the electronic device 301 may determine that there is a need for correcting the raw image 331 under the control of the processor 310 at operation 703 if the degree of shake of the electronic device 301 at the time of shooting is high.

In various embodiments, the electronic device 301 may determine that there is a need for correcting the raw image 331 under the control of the processor 310 at operation 703 if the recognized information about the raw image 331 is not meaningful. For example, the electronic device 301 may determine that there is a need for correction if an object included in the raw image 331 does not belong to the categories of Table 1. It is possible to include information about classification as shown in Table 1 for analyzing the raw image 331 and classifying the information about the recognized object in the image.

In various embodiments, the electronic device 301 may check the expected level of image enhancement due to correction under the control of the processor 310 at operation 703 to determine whether there is a need for correcting the raw image 331. The electronic device 301 may determine that there is no need for correcting the raw image 331 if the expected level of image enhancement due to correction is low.

Upon determining that there is a need for correcting the raw image 331 under the control of the processor 310 at operation 703, the procedure may proceed to operation 705.

Upon determining that there is no need for correcting the raw image 331 under the control of the processor 310 at operation 703, the procedure may proceed to operation 709.

At operation 709, the electronic device 301 may perform image processing of the raw image 331 through the hybrid ISP 313, compress the processed raw image 331 through the compressor 315, and store the compressed image (e.g., compressed image 335) in the memory 330.

At operation 705, to correct the raw image 331, the electronic device 301 may transmit the raw image 331 to the external electronic device 300 via the communication module under the control of the processor 310.

Upon receiving the raw image 331 from the electronic device 301, the external electronic device 300 may correct the raw image 331 via the cloud ISP 353 and compress the corrected raw image 331 via the compressor 354 to generate a compressed image 335.

The external electronic device 300 may transmit the corrected and compressed raw image 331 (e.g., the compressed image 335) to the electronic device 301.

At operation 707, the electronic device 301 may receive the corrected image from the external electronic device 300 and store it in the memory 330.

Figure 8:
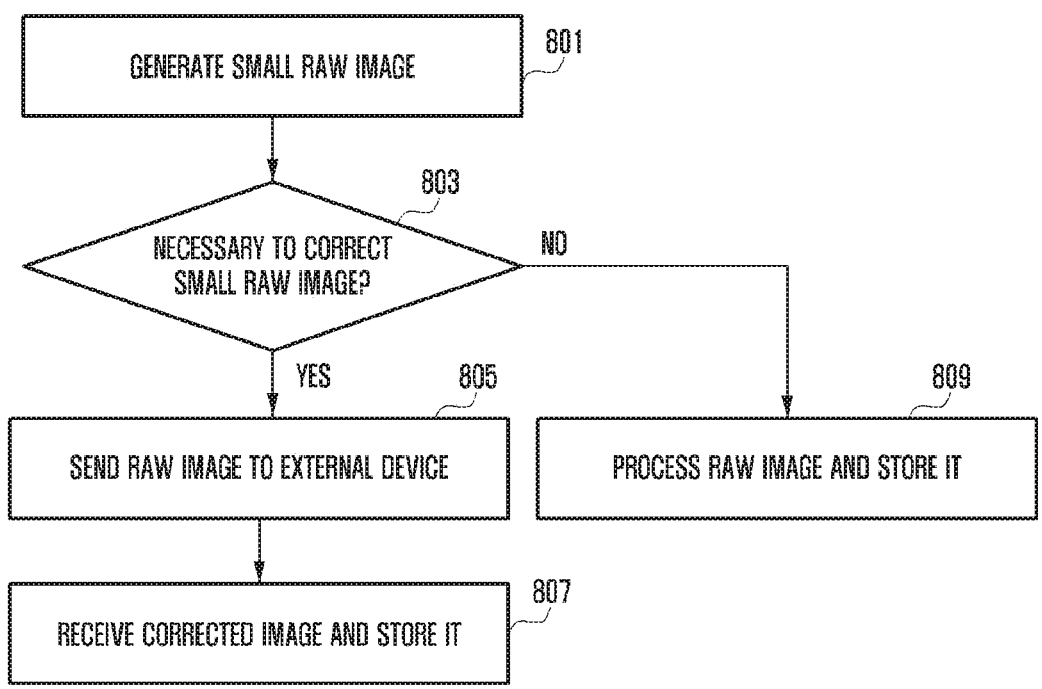
FIG. 8 is a flowchart of a selective image transmission method according to an embodiment of the disclosure.

FIG. 8 is a flowchart of a selective image transmission method according to an embodiment of the disclosure.

At operation 801, the electronic device 301 may generate a small raw image 332 under the control of the processor 310. The electronic device 301 may obtain a raw image 331 of an external entity using the image sensor 320, and generate a small raw image 332 by downscaling the obtained raw image 331 through the small raw image generator 311.

At operation 803, the electronic device 301 may determine whether there is a need for correcting the raw image 331 under the control of the processor 310.

In various embodiments, to determine whether there is a need for correcting the raw image 331 at operation 803, the electronic device 301 may generate a small raw image 332 and transmit the small raw image 332 to the external electronic device 300 via the communication module. Upon receiving the small raw image 332 from the electronic device 301, the external electronic device 300 may identify the correction information. For example, the external electronic device 300 may use the recognition module 351 to generate correction information for the raw image 331 based on the small raw image 332 received from the electronic device 301. The external electronic device 300 may transmit the correction information for the raw image 331 to the electronic device 301. The electronic device 301 may receive the correction information for the raw image 331 from the external electronic device 300. The electronic device 301 may determine whether correction for the raw image 331 is necessary at operation 803 based on the correction information for the raw image 331 received from the external electronic device 300.

In various embodiments, the correction information for the raw image 331 being generated using the small raw image 332 may be related with the degree to which the raw image 331 is blurred, the degree of shake of the electronic device 301 at the time of shooting, the extent to which the recognized information is meaningful, and the expected level of image enhancement due to correction.

In various embodiments, the electronic device 301 may determine that there is a need for correction under the control of the processor 310 at operation 803 if the degree to which the raw image 331 is blurred is above a threshold.

In various embodiments, the electronic device 301 may determine that there is a need for correction under the control of the processor 310 at operation 803 if the degree of shake of the electronic device 301 at the time of shooting is high.

In various embodiments, the electronic device 301 may determine that there is a need for correction under the control of the processor 310 at operation 803 if the recognized information about the raw image 331 is not meaningful. For example, the electronic device 301 may determine that there is a need for correction if an object included in the raw image 331 does not belong to the categories of Table 1. It is possible to include information about classification as shown in Table 1 for analyzing the raw image 331 and classifying the information about the recognized object in the image.

In various embodiments, the electronic device 301 may check the expected level of image enhancement due to correction under the control of the processor 310 at operation 803 to determine whether there is a need for correcting the raw image 331. The electronic device 301 may determine that there is no need for correction if the expected level of image enhancement due to correction is low.

Upon determining that there is a need for correcting the raw image 331 under the control of the processor 310 at operation 803, the procedure may proceed to operation 805.

Upon determining that there is no need for correcting the raw image 331 under the control of the processor 310 at operation 803, the procedure may proceed to operation 809.

At operation 809, the electronic device 301 may perform image processing of the raw image 331 through the hybrid ISP 313, compress the processed raw image 331 through the compressor 315, and store the compressed image (e.g., compressed image 335) in the memory 330.

At operation 805, to correct the raw image 331, the electronic device 301 may transmit the raw image 331 to the external electronic device 300 via the communication module under the control of the processor 310.

Upon receiving the raw image 331 from the electronic device 301, the external electronic device 300 may correct the raw image 331 via the cloud ISP 353 and compress the corrected raw image 331 via the compressor 354 to generate a compressed image 335.

The external electronic device 300 may transmit the corrected and compressed raw image 331 (e.g., compressed image 335) to the electronic device 301.

At operation 807, the electronic device 301 may receive the corrected image from the external electronic device 300 and store it in the memory 330.

Figure 9:
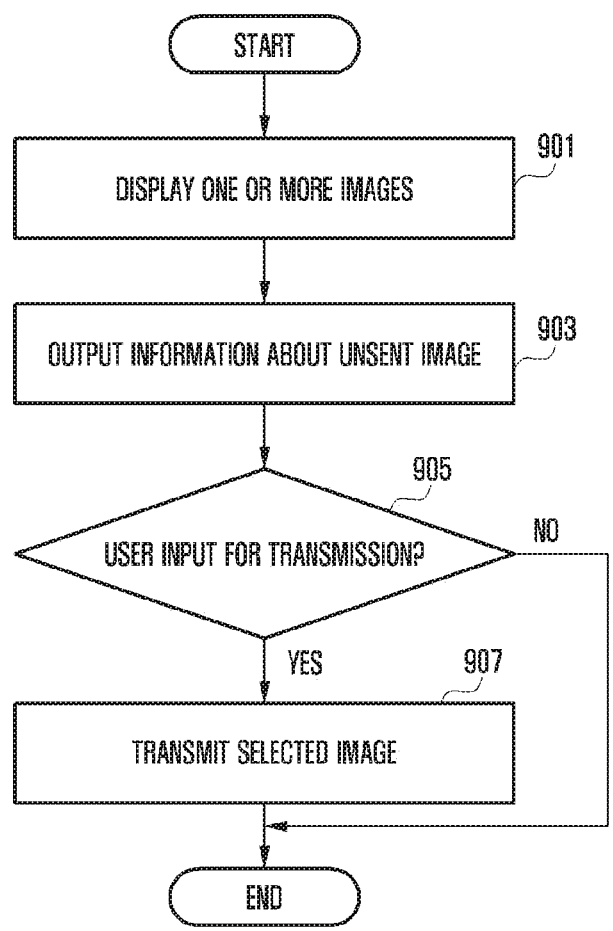
FIG. 9 is a flowchart of a method for transmitting an image that has not yet been transmitted from the electronic device to the external electronic device according to an embodiment of the disclosure.

FIG. 9 is a flowchart of a method for transmitting an image that has not yet been transmitted from the electronic device 301 to the external electronic device 300 according to an embodiment of the disclosure.

At operation 901, the electronic device 301 may display at least one image on the display 340 under the control of the processor 310. For example, the electronic device 301 may display one or more images on the display 340 as thumbnails when a photo view application or an application for displaying photos or images is activated according to user input.

At operation 903, if there is an image that has not yet been transmitted to the external electronic device 300, the electronic device 301 may display information about unsent images under the control of the processor 310. The unsent image may be highlighted with, for example, a shade or a border.

At operation 905, the electronic device 301 may receive user input to determine whether to transmit an unsent image to the external electronic device 300 under the control of the processor 310. If a user input is received, the procedure may proceed to operation 907.

At operation 907, the electronic device 301 may transmit the image selected by the user input to the external electronic device 300 under the control of the processor 310.

Figure 10:
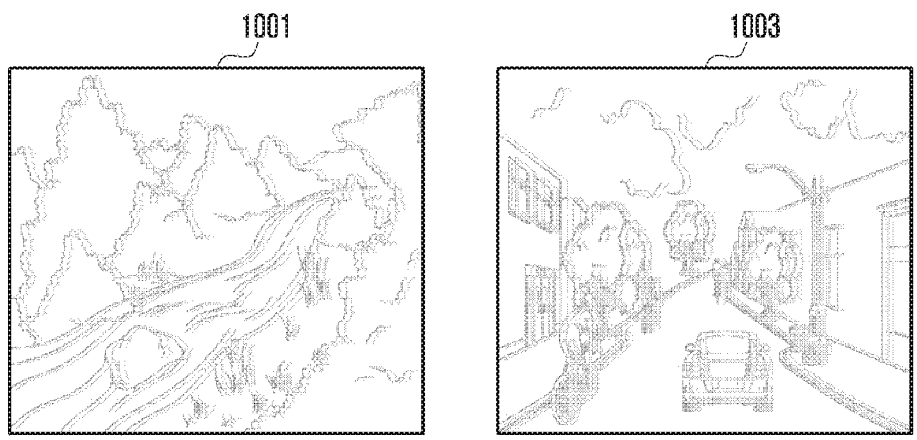
FIG. 10 illustrates images that are not transmitted according to an embodiment of the disclosure.

FIG. 10 illustrates images that are not transmitted according to an embodiment of the disclosure. After image processing by the recognition module 351 or the hybrid ISP, an image whose level of blur is above a threshold (e.g., image 1001 or 1003) may be not transmitted from the electronic device 301 to the external electronic device 300.

Figure 11:
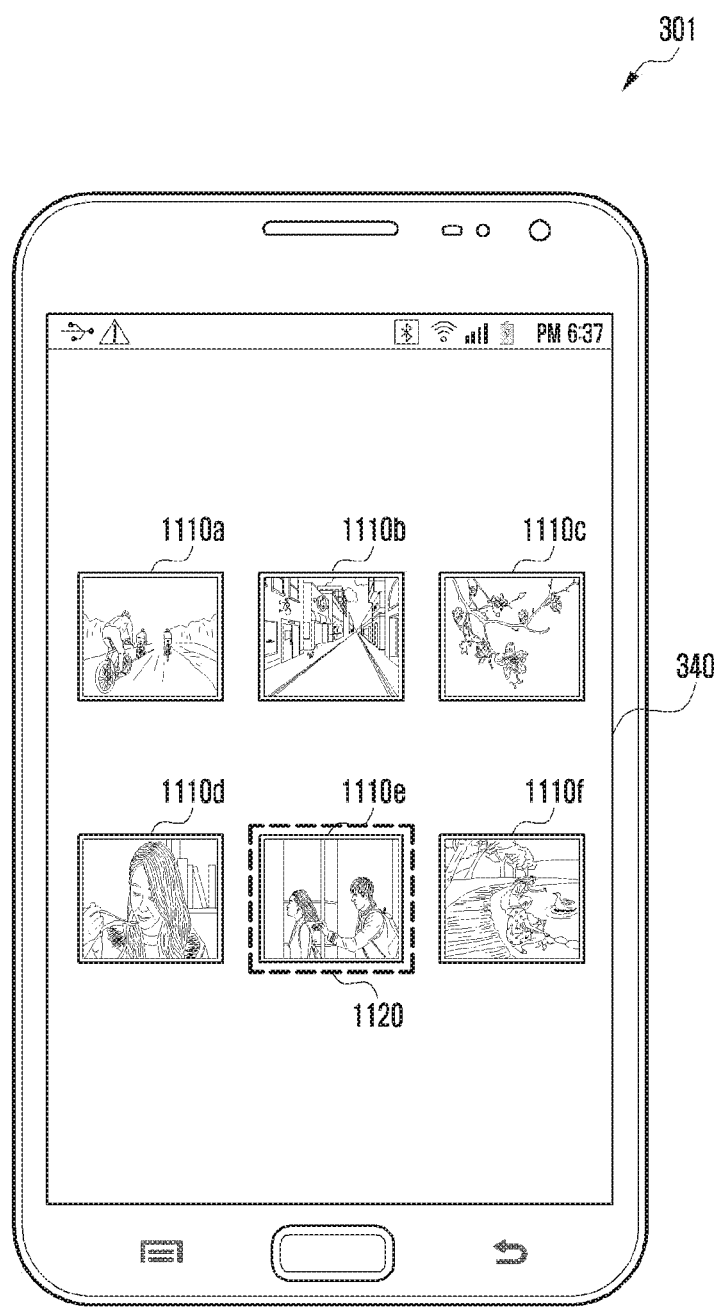
FIG. 11 depicts the method of FIG. 9 for transmitting an image that has not yet been transmitted from the electronic device to the external electronic device according to an embodiment of the disclosure.

FIG. 11 depicts the method of FIG. 9 for transmitting an image that has not yet been transmitted from the electronic device 301 to the external electronic device 300 according to an embodiment of the disclosure. When a photo view application or an application for displaying photos or images is activated, the electronic device 301 may display one or more images 1110a, 1110b, 1110c, 1110d, 1110e and 1110f on the display 340. The electronic device 301 may display specific information 1120 for an unsent image. The unsent image may be highlighted with, for example, a shade or a border.

The electronic device according to various embodiments disclosed herein can be one of various types of devices, such as portable communication devices (e.g., smartphones), computers, portable multimedia devices, portable medical instruments, cameras, wearable devices, and home appliances. However, the electronic device is not limited to the above-mentioned devices.

It should be understood that the various embodiments of the present document and the terminology used are not intended to limit the techniques described herein to specific embodiments but to include various modifications, equivalents, and/or alternatives thereof. In the drawings, the same or similar reference symbols are used to refer to the same or like parts. In the description, the singular forms "a", "an" and "the" are intended to include the plural forms as well, unless the context clearly indicates otherwise. In the description, the expression "A or B", "at least one of A and/or B", "A, B or C", or "at least one of A, B and/or C" may indicate all possible combinations of the listed items. The terms "first" and "second" may refer to various elements regardless of importance and/or order and are used to distinguish one element from another element without limitation. It will be understood that when an element (e.g., first element) is referred to as being (operatively or communicatively) "coupled with/to" or "connected with/to" another element (e.g., second element), it can be coupled or connected with/to the other element directly or via a third element.

In the description, the term "module" may refer to a certain unit that includes one of hardware, software, firmware, or any combination thereof. The term "module" may be used interchangeably with the term "unit", "logic", "logical block", "component", or "circuit", for example. The module may be the minimum unit of a single-bodied component or a part thereof. The module may be the minimum unit, or a part thereof, which performs one or more particular functions. For example, the module may include an application-specific integrated circuit (ASIC) chip.

Various embodiments of the present document may be implemented in software (e.g., programs 140) including instructions stored in a machine-readable storage medium (e.g., internal memory 136 or external memory 138) readable by a machine (e.g., computer). The machine is a device that can fetch a stored instruction from a storage medium and operate according to the fetched instruction, and may include an electronic device (e.g., electronic device 101) in accordance with the disclosed embodiments. When the instruction is executed by a processor (e.g., processor 120), the processor may perform the function corresponding to the instruction directly or using other components. The instructions may include a code generated by a compiler and a code executable by an interpreter. The machine-readable storage medium may be provided in the form of a non-transitory storage medium. Here, "non-transitory" means that the storage medium does not include a signal and is tangible, but does not distinguish whether data is stored semi-permanently or temporarily in the storage medium.

The method according to various embodiments disclosed herein may be provided as a computer program product. A computer program product may be traded between a seller and a purchaser as a commodity. A computer program product may be distributed in the form of a machine-readable storage medium (e.g., compact disc read only memory (CD-ROM)) or be distributed online through an application store (e.g., PlayStore™). For on-line distribution, at least a portion of the computer program product may be temporarily stored or temporarily created in a storage medium such as a memory of a manufacturer's server, an application store's server, or a relay server.

Each of the components (e.g., modules or programs) according to various embodiments described above may be composed of one or more elements. An existing component may be omitted, and a new component may be added. Alternatively or additionally, some of the components may be combined into one entity while maintaining the same functionality. Operations supported by a module, program, or another component may be carried out in sequence, in parallel, by repetition, or heuristically. Some operations may be executed in a different order or may be omitted, and a new operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera;
a memory;
a communication circuit; and
at least one processor configured to:
    obtain a raw image of an external object using the camera,
    generate a small raw image that corresponds to at least a portion of the raw image and has a smaller data size than the raw image on the basis of the raw image,
    transmit the small raw image to an external electronic device via the communication circuit,
    receive information about a recognized category determined by the external electronic device based on at least the small raw image,
    determine whether a correction of the raw image is necessary based on at least one of correction information or the received information about the recognized category,
    when the correction of the raw image is determined not to be necessary, store an image corresponding to the raw image in the memory, and
    when the correction of the raw image is determined to be necessary, transmit the raw image to an external electronic device via the communication circuit so as to enable the external electronic device to generate a corrected image of the raw image, and store the corrected image in the memory.

2. The electronic device of claim 1, wherein the at least one processor is further configured to:
determine whether the correction of the raw image is necessary at least partially on the basis of information about the small raw image.

3. The electronic device of claim 1, wherein the at least one processor is further configured to, upon receiving the correction information, generating another corrected image by using at least one of the raw image or the correction information.

4. The electronic device of claim 1, wherein the at least one processor is further configured to:
receive the correction information determined by the external electronic device based on at least the small raw image; and
determine whether to correct the raw image based on at least the received correction information.

5. The electronic device of claim 1, wherein the at least one processor is further configured to determine whether the correction of the raw image is necessary based on a degree to which the raw image is blurred and an expected level of image enhancement due to the correction.

6. The electronic device of claim 5, wherein the at least one processor is further configured not to transmit the raw image to the external electronic device when the degree to which the raw image is blurred is above a given threshold.

7. The electronic device of claim 5, wherein the at least one processor is further configured not to transmit the raw image to the external electronic device upon determining that the correction using the external electronic device is not necessary based on an evaluated quality of the raw image.

8. The electronic device of claim 1, wherein the at least one processor is further configured not to transmit the raw image to the external electronic device when an object included in the small raw image is determined not to belong to any of the recognizable categories.

9. The electronic device of claim 1, wherein the at least one processor is further configured to:
control a display to output one or more images; and
when there is an unsent image, output information about the unsent image.

10. A method for an electronic device, the method comprising:
obtaining a raw image of an external object using a camera;
generating a small raw image that corresponds to at least a portion of the raw image and has a smaller data size than the raw image on the basis of the raw image;
transmitting the small raw image to an external electronic device via a communication circuit;
receiving information about a recognized category determined by the external electronic device based on at least the small raw image;
determining whether a correction of the raw image, using at least one of correction region information or the received information about the recognized category is necessary;
when the correction of the raw image is determined to be not necessary, storing an image corresponding to the raw image in a memory; and
when the correction of the raw image is determined to be necessary, transmitting the raw image to an external electronic device via the communication circuit so as to enable the external electronic device to generate a corrected image of the raw image, and storing the corrected image in the memory.

11. The method of claim 10, further comprising:
determining whether correction of the raw image is necessary at least partially on a basis of information about the small raw image.

12. The method of claim 11, further comprising:
receiving the correction information determined by the external electronic device based on at least the small raw image; and
determining whether to correct the raw image based on at least the received correction information.

13. The method of claim 10, further comprising:
upon receiving the correction information, generating another corrected image by using at least one of the raw image or the correction information.

14. The method of claim 10, further comprising:
determining whether the correction of the raw image is necessary based on a degree to which the raw image is blurred and an expected level of image enhancement due to the correction.

15. The method of claim 14,
wherein the determining of whether the correction of the raw image is necessary is based on the degree to which the raw image is blurred and the expected level of image enhancement due to the correction, and
wherein the method further comprises:
when the degree to which the raw image is blurred is above a given threshold, preventing the raw image from being transmitted to the external electronic device.

16. The method of claim 14,
wherein the determining of whether the correction of the raw image is necessary is based on the degree to which the raw image is blurred and the expected level of image enhancement due to the correction, and
wherein the method further comprises:
upon determining that correction using the external electronic device is not necessary based on an evaluated quality of the raw image, preventing the raw image from being transmitted to the external electronic device.

17. The method of claimer 11, further comprising:
when an object included in the small raw image is determined not to belong to any of the recognizable categories, preventing the raw image from being transmitted to the external electronic device.

18. The method of claim 10, further comprising:
controlling a display to output one or more images; and
when there is an unsent image, outputting information about the unsent image.

* * * * *